(12) United States Patent
Dong

(10) Patent No.: US 11,621,987 B2
(45) Date of Patent: Apr. 4, 2023

(54) METHOD FOR PROCESSING STREAMING MEDIA DATA

(71) Applicant: BOE Technology Group Co., Ltd., Beijing (CN)

(72) Inventor: Chaofeng Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/404,486

(22) Filed: Aug. 17, 2021

(65) Prior Publication Data

US 2022/0141272 A1 May 5, 2022

(30) Foreign Application Priority Data

Oct. 30, 2020 (CN) .......................... 202011188308.5

(51) Int. Cl.
G06F 13/00 (2006.01)
H04L 65/61 (2022.01)
H04W 76/10 (2018.01)
H04L 67/568 (2022.01)

(52) U.S. Cl.
CPC ............ H04L 65/61 (2022.05); H04L 67/568 (2022.05); H04W 76/10 (2018.02)

(58) Field of Classification Search
CPC ....... H04L 65/61; H04L 67/568; H04L 65/65; H04L 65/765; H04W 76/20; H04W 76/10; H04N 21/2183; H04N 21/23106; H04N 21/64322

USPC ........ 709/231, 217–219, 245, 212–216, 223, 709/203, 230
See application file for complete search history.

(56) References Cited

U.S. PATENT DOCUMENTS

| | | | | |
|---|---|---|---|---|
| 7,421,437 | B2* | 9/2008 | Hoeft | H04L 67/568 |
| 9,112,826 | B2* | 8/2015 | Gero | H04L 45/7453 |
| 9,451,298 | B2* | 9/2016 | Yamagishi | H04N 21/20 |
| 10,866,953 | B2* | 12/2020 | Damm | G06F 16/24539 |
| 2005/0102277 | A1* | 5/2005 | Hoeft | G06F 16/9574 |
| 2010/0179987 | A1* | 7/2010 | Sebastian | H04L 69/04 |
| | | | | 709/224 |
| 2013/0185387 | A1* | 7/2013 | Gero | H04L 67/5651 |
| | | | | 709/217 |
| 2014/0173018 | A1* | 6/2014 | Westphal | H04L 41/342 |
| | | | | 709/213 |
| 2014/0189772 | A1* | 7/2014 | Yamagishi | H04N 21/21805 |
| | | | | 725/116 |
| 2016/0342650 | A1* | 11/2016 | Damm | G06F 16/24539 |

* cited by examiner

Primary Examiner — Kenneth R Coulter
(74) Attorney, Agent, or Firm — Ipro, PLLC

(57) ABSTRACT

A method for processing streaming media data includes: receiving the streaming media data, and caching the streaming media data at a cache server in accordance with a cache dictionary; establishing a connection between a client and the cache server, and determining target streaming media data corresponding to the client, the client including a plug-in end and a subscription end; and pushing the target streaming media data to the client.

20 Claims, 5 Drawing Sheets

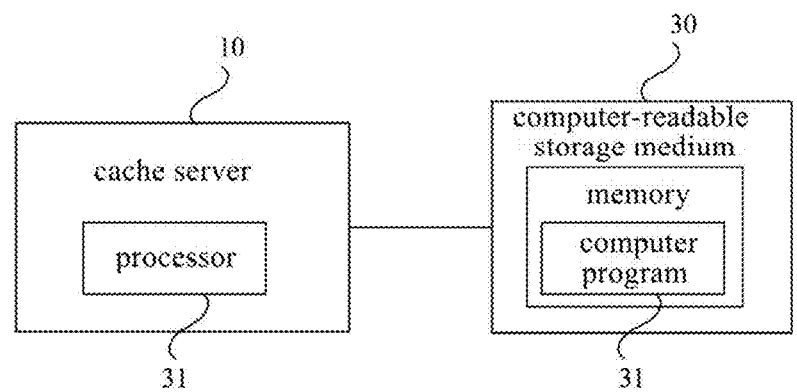
FIG. 4
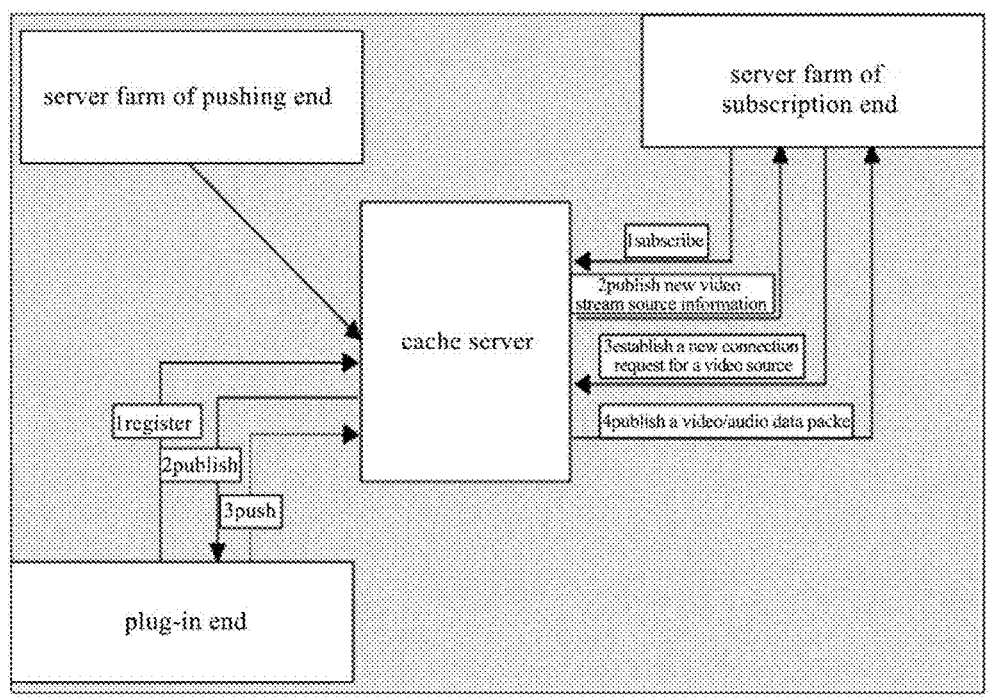
FIG. 5
FIG. 6

METHOD FOR PROCESSING STREAMING MEDIA DATA

CROSS-REFERENCE TO RELATED APPLICATION

This application claims a priority of the Chinese patent application No. 202011188308.5 filed on Oct. 30, 2020, which is incorporated herein by reference in its entirety.

TECHNICAL FIELD

The present disclosure relates to the field of streaming media processing, in particular to a method for processing streaming media data, a server, an electronic device and a computer-readable storage medium.

BACKGROUND

In an era of $4^{th}$-Generation (4G) or $5^{th}$-Generation (5G), timeliness of streaming media data is highly demanded, and a video is required to be processed in various ways, e.g., adding super-resolution, watermarking, saving and replaying. In other words, when a user is currently watching a high-resolution real-time video, such a phenomenon as delay occurs. In addition, it is impossible for a third-party plug-in end to process the streaming media data in real time, e.g., to replay the video and forward video streaming, so it is impossible to meet the requirement on diversity.

SUMMARY

In a first aspect, the present disclosure provides in some embodiments a method for processing streaming media data, including: receiving the streaming media data, and caching the streaming media data at a cache server in accordance with a cache dictionary; establishing a connection between a client and the cache server, and determining target streaming media data corresponding to the client, the client including a plug-in end and a subscription end; and pushing the target streaming media data to the client.

In a possible embodiment of the present disclosure, the cache dictionary includes a management data pool and a link list, and the management data pool includes a sequence list. The sequence list includes a connection request and a corresponding pushing connection transmitted by a pushing end to the cache server, a connection request and a corresponding subscription connection transmitted by the subscription end to the cache server, and a connection request and a corresponding plug-in connection transmitted by the plug-in end to the cache server. The link list includes index numbers and information about the streaming media data corresponding to each index number, and the index numbers correspond to the pushing connections and the plug-in connections in the sequence list respectively.

In a possible embodiment of the present disclosure, the establishing the connection between the client and the cache server and determining the target streaming media data corresponding to the client includes: establishing the connection between the client and the cache server in accordance with a connection request from the client; and determining the target streaming media data in accordance with the connection request from the client and the streaming media data acquired through querying the cache dictionary.

In a possible embodiment of the present disclosure, the receiving the streaming media data and caching the streaming media data at the cache server in accordance with the cache dictionary includes: allocating a corresponding co-routine in accordance with the connection request from the pushing end, so as to establish a connection between the pushing end and the cache server; monitoring the connection between the pushing end and the cache server to receive the streaming media data; and caching data packets in the received streaming media data sequentially in accordance with a streaming media type, the streaming media type including a live type and a play type.

In a possible embodiment of the present disclosure, the pushing end is connected to the cache server through a Transmission Control Protocol (TCP) and configured to transmit the connection request through a JavaScript Object Notation (JSON) character string, and/or the client is connected to the cache server through a TCP and configured to transmit the connection request through a JSON character string.

In a possible embodiment of the present disclosure, the connection request from the pushing end includes an identity, a type, a name and an address of the streaming media data, the connection request from the client includes a subscription connection request and a plug-in connection request, the subscription connection request includes the identity, the type, the name and the address of the streaming media data, and the plug-in connection request includes the type, the name and authentication of the streaming media data.

In a possible embodiment of the present disclosure, the pushing the target streaming media data to the client includes: pushing data packets in the streaming media data of a live type to the client sequentially in accordance with the connection request from the client; and allocating a corresponding co-routine in accordance with the connection request from the client to push data packets in the streaming media data of a play type to the client sequentially.

In a possible embodiment of the present disclosure, when the streaming media type is the live type and the cache server is disconnected from the pushing end, the connection between the cache server and the corresponding client is interrupted, and the streaming media data cached in the cache server is removed.

In a second aspect, the present disclosure provides in some embodiments a cache server, including: a cache circuitry configured to receive streaming media data, and cache the streaming media data at a cache server in accordance with a cache dictionary; a determination circuitry configured to establish a connection between a client and the cache server, and determine target streaming media data corresponding to the client, the client including a plug-in end and a subscription end; and a pushing circuitry configured to push the target streaming media data to the client.

In a possible embodiment of the present disclosure, the cache dictionary includes a management data pool and a link list, and the management data pool includes a sequence list. The sequence list includes a connection request and a corresponding pushing connection transmitted by a pushing end to the cache server, a connection request and a corresponding subscription connection transmitted by the subscription end to the cache server, and a connection request and a corresponding plug-in connection transmitted by the plug-in end to the cache server. The link list includes index numbers and information about the streaming media data corresponding to each index number, and the index numbers correspond to the pushing connections and the plug-in connections in the sequence list respectively.

In a possible embodiment of the present disclosure, the determination circuitry is further configured to: establish the connection between the client and the cache server in accordance with a connection request from the client; and determine the target streaming media data in accordance with the connection request from the client and the streaming media data acquired through querying the cache dictionary.

In a possible embodiment of the present disclosure, the cache circuitry is further configured to: allocate a corresponding co-routine in accordance with the connection request from the pushing end, so as to establish a connection between the pushing end and the cache server; monitor the connection between the pushing end and the cache server to receive the streaming media data; and cache data packets in the received streaming media data sequentially in accordance with a streaming media type, the streaming media type including a live type and a play type.

In a possible embodiment of the present disclosure, the pushing end is connected to the cache server through a TCP and configured to transmit the connection request through JSON character string, and/or the client is connected to the cache server through a TCP and configured to transmit the connection request through JSON character string.

In a possible embodiment of the present disclosure, the connection request from the pushing end includes an identity, a type, a name and an address of the streaming media data, the connection request from the client includes a subscription connection request and a plug-in connection request, the subscription connection request includes the identity, the type, the name and the address of the streaming media data, and the plug-in connection request includes the type, the name and authentication of the streaming media data.

In a possible embodiment of the present disclosure, the pushing circuitry is further configured to: push data packets in the streaming media data of a live type to the client sequentially in accordance with the connection request from the client; and allocate a corresponding co-routine in accordance with the connection request from the client to push data packets in the streaming media data of a play type to the client sequentially.

In a possible embodiment of the present disclosure, when the streaming media type is the live type and the cache server is disconnected from the pushing end, the connection between the cache server and the corresponding client is interrupted, and the streaming media data cached in the cache server is removed.

In a third aspect, the present disclosure provides in some embodiments a non-transitory computer-readable storage medium storing therein a computer program. The computer program is executed by one or more processors so as to: receive the streaming media data, and cache the streaming media data at a cache server in accordance with a cache dictionary; establish a connection between a client and the cache server, and determine target streaming media data corresponding to the client, the client including a plug-in end and a subscription end; and push the target streaming media data to the client.

In a possible embodiment of the present disclosure, the cache dictionary includes a management data pool and a link list, and the management data pool includes a sequence list. The sequence list includes a connection request and a corresponding pushing connection transmitted by a pushing end to the cache server, a connection request and a corresponding subscription connection transmitted by the subscription end to the cache server, and a connection request and a corresponding plug-in connection transmitted by the plug-in end to the cache server. The link list includes index numbers and information about the streaming media data corresponding to each index number, and the index numbers correspond to the pushing connections and the plug-in connections in the sequence list respectively.

In a possible embodiment of the present disclosure, the establishing the connection between the client and the cache server and determining the target streaming media data corresponding to the client includes: establishing the connection between the client and the cache server in accordance with a connection request from the client; and determining the target streaming media data in accordance with the connection request from the client and the streaming media data acquired through querying the cache dictionary.

In a fourth aspect, the present disclosure provides in some embodiments an electronic device, including a processor and a memory storing therein a computer program. The computer program is executed by the processor so as to implement the above-mentioned method for processing the streaming media data.

BRIEF DESCRIPTION OF THE DRAWINGS

The above and/or additional aspects and advantages of the present disclosure will become more apparent and comprehensible with respect to the following drawings.

FIG. 4 is a schematic view showing a computer-readable storage medium according to one embodiment of the present disclosure;

FIG. 5 is a schematic view showing a cache dictionary in the cache server according to one embodiment of the present disclosure;

FIG. 6 is a schematic view showing a scenario for the method for processing the streaming media data according to one embodiment of the present disclosure;

DETAILED DESCRIPTION

Figure 1:
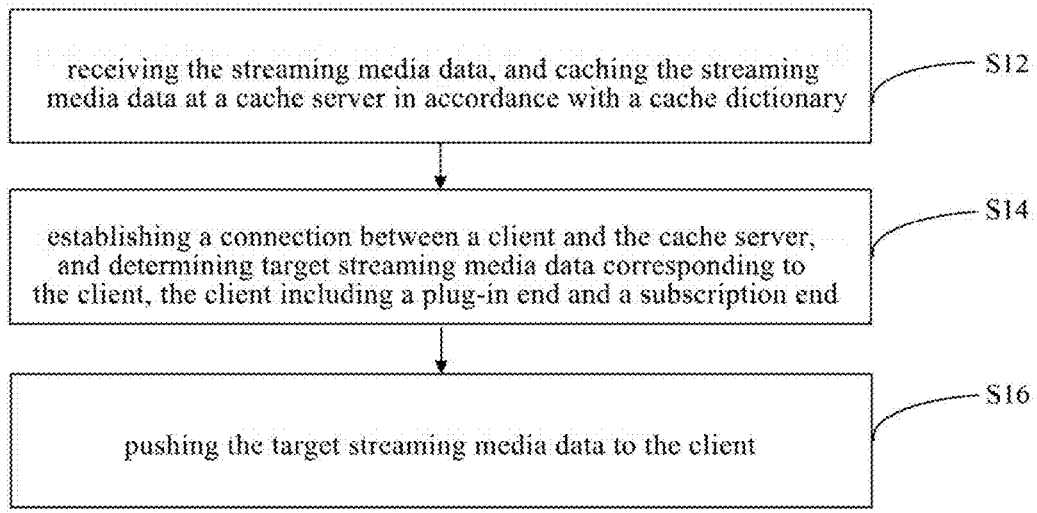
FIG. 1 is a flow chart of a method for processing streaming media data according to one embodiment of the present disclosure.

The present disclosure will be described hereinafter in conjunction with the embodiments and the drawings. Identical or similar reference numbers in the drawings represent an identical or similar element or elements having an identical or similar function. The following embodiments are for illustrative purposes only, but shall not be used to limit the scope of the present disclosure.

The present disclosure provides in some embodiments a method for processing streaming media data which, as shown in FIG. 1, includes: S12 of receiving the streaming media data, and caching the streaming media data at a cache server in accordance with a cache dictionary; S14 of establishing a connection between a client and the cache server, and determining target streaming media data corresponding to the client, the client including a plug-in end and a subscription end; and S16 of pushing the target streaming media data to the client.

It should be appreciated that, usually the method for processing the streaming media data is implemented through a cache server 10 described hereinafter. Of course, the method is also implemented by a computer of any other type or at any other network node in accordance with the practical need and a network configuration, e.g., a desktop computer, a portable computer, a laptop computer or a blade computer.

Figure 2:
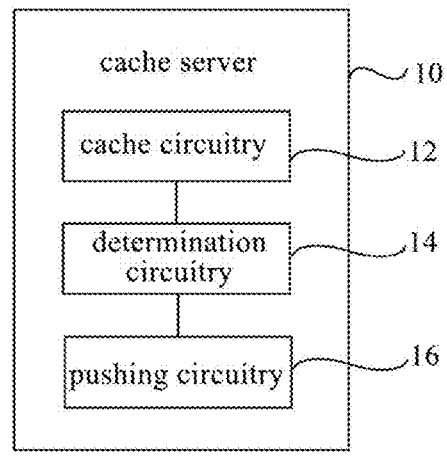
FIG. 2 is a schematic view showing a cache server according to one embodiment of the present disclosure.

The present disclosure further provides in some embodiments the cache server 10 which, as shown in FIG. 2, includes a cache circuitry 12, a determination circuitry 14 and a pushing circuitry 16.

Based on FIG. 1, it should be appreciated that, S12 is implemented by the cache circuitry 12, S14 is implemented by the determination circuitry 14, and S16 is implemented by the pushing circuitry 16. In other words, the cache circuitry 12 is configured to receive the streaming media data, and cache the streaming media data at the cache server in accordance with the cache dictionary. The determination circuitry 14 is configured to establish a connection between the client and the cache server, and determine the target streaming media data corresponding to the client. The pushing circuitry 16 is configured to push the target streaming media data to the client.

To be specific, as shown in FIG. 6, the streaming media data includes streaming media data of a live type and streaming media data of a play type. The streaming media data is uploaded at a pushing end, and the client refers to a subscription end and a plug-in end corresponding to the pushing end. A server farm of the pushing end mainly uploads and pushes various live videos and play videos. A server farm of the subscription end in the client mainly refers to a user group which subscribes the live video or the play video. A server farm of the plug-in end in the client mainly refers to a user group which performs third-party processings on the streaming media data about the live video or the play video uploaded by the pushing end, and the third-party processings include such operations as duplication, replacement and creation on the streaming media data.

In the embodiments of the present disclosure, the cache server 10 supports a subscription function and a publishing function, so as to publish (or push) a data stream to the client while ensuring a low delay. In addition, the cache server 10 supports a third party to process (store or push back) the data stream in real time through the plug-in end.

Figure 3:
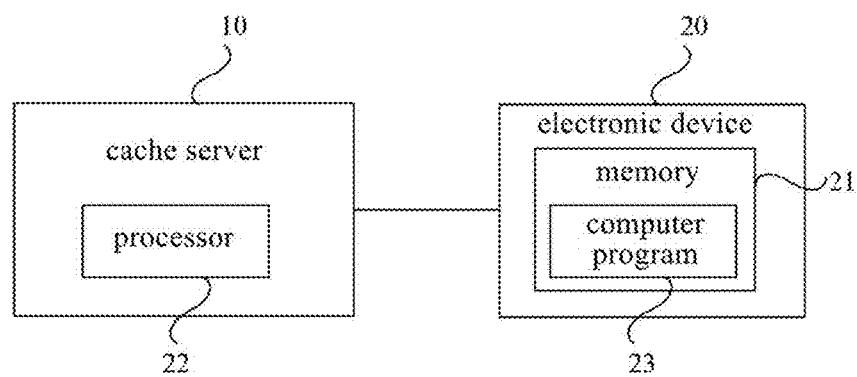
FIG. 3 is a schematic view showing an electronic device according to one embodiment of the present disclosure.

The present disclosure further provides in some embodiments an electronic device 20 which, as shown in FIG. 3, includes a processor 21 and a memory 22 storing therein a computer program 23. The computer program is executed by the processor 21, so as to: receive streaming media data, and cache the streaming media data at a cache server in accordance with a cache dictionary; establish a connection between a client and the cache server, and determine target streaming media data corresponding to the client, the client including a plug-in end and a subscription end; and push the target streaming media data to the client. The electronic device 20 is a device capable of receiving and caching thee streaming media data, e.g., a smart device such as mobile phone, ipad or tablet computer, which will not be particularly defined herein.

As shown in FIG. 4, the present disclosure further provides in some embodiments a non-transitory computer-readable storage medium 30 storing therein a computer program 31.

The computer program 31 is executed by one or more processor 32, so as to implement the steps of the above-mentioned method.

For example, the computer program is executed by the processor 32, so as to implement the following steps: S12 of receiving streaming media data, and caching the streaming media data at a cache server in accordance with a cache dictionary; S14 of establishing a connection between a client and the cache server, and determining target streaming media data corresponding to the client; and S16 of pushing the target streaming media data to the client.

The computer-readable storage medium 30 is arranged in the processor 32 or a data source reader. At this time, the processor 32 or the data source reader is capable of communicating with a cloud server to acquire the corresponding computer program 31.

It should be appreciated that, the computer program 31 includes a computer program code in the form of a source code, an object code, an executable file or an intermediate form. The computer-readable storage medium includes any entity or device capable of carrying the computer program code, a record medium, a Universal Serial Bus (USB) flash disk, a mobile hard disk, a magnetic disk, an optical disk, a computer memory, a Read-Only Memory (ROM), a Random Access Memory (RAM), or a software distribution medium.

According to the method for processing the streaming media data, the server, the electronic device and the computer-readable storage medium in the embodiments of the present disclosure, the streaming media data (the live data and the video-play data) is supported to be sequentially cached in accordance with the cache dictionary, and the connection between the client and the cache server is established, so as to push the target streaming media data to the client through the cache server in time, thereby to reduce the delay for a real-time high-definition video, and push the high-definition video to the client rapidly. In addition, it is able for the third-party plug-in end to replay the forward the high-definition video in time, thereby to meet the requirement on diversity.

As shown in FIG. 5, in some embodiments of the present disclosure, the cache dictionary includes a management data pool and a link list 2, and the management data pool includes a sequence list 1. The sequence list 1 includes a connection request and a corresponding pushing connection transmitted by a pushing end to the cache server 10, a connection request and a corresponding subscription connection transmitted by the subscription end to the cache server 10, and a connection request and a corresponding plug-in connection transmitted by the plug-in end to the cache server 10. The link list 2 includes index numbers sid and information s0, s1, s2, . . . , sN−1, sN about the streaming media data corresponding to each index number, and the index numbers sid correspond to the pushing connections and the plug-in connections in the sequence list 1 respectively.

To be specific, the cache dictionary refers to the streaming media data cached and managed in the form of a database data dictionary. The database data dictionary is a structure consisting of a group of lists and views. The database data dictionary is mainly used to store data, and it is a center of each database and also very important to each user. The user accesses the database data dictionary using a Structured Query Language (SQL) sentence. The SQL is a language for querying a database and designing a program, and it is used to access data, and query, update and manage a relational database system. An information set regarding data is a directory recording a database and application metadata and capable of being accessed by the user, and it is used to physically and logically describe list information in the database.

As shown in FIG. 5, the pool in the cache dictionary includes the sequence list 1. The sequence list 1 includes a connection request and a corresponding pushing connection transmitted by the pushing end to the cache server (e.g., the pushing connection is addr1:conn in the sequence list 1 in FIG. 5), a connection request and a corresponding subscription connection transmitted by the subscription end to the cache server (e.g., the subscription connection is addr2:conn in the sequence list 1 in FIG. 5), and a connection request and a corresponding plug-in connection transmitted by the plug-in end to the cache server (e.g., the plug-in connection is addrN:conn in the sequence list 1 in FIG. 5). The connection request from the pushing end includes an identity, a type, a name and an address of the streaming media data, the connection request from the client includes a subscription connection request and a plug-in connection request, the subscription connection request includes the identity, the type, the name and the address of the streaming media data, and the plug-in connection request includes the type, the name and authentication of the streaming media data. Hence, through the method in the embodiments of the present disclosure, it is able to transmit the connection requests for the streaming media data to the cache server simultaneously through three ports (as shown in FIG. 6). In other words, three types of connections (i.e., the pushing connection, the subscription connection and the plug-in connection) are established simultaneously, and managed by the management data pool in the cache server efficiently, so as to ensure the security of the streaming media data, and reduce the delay for the real-time high-definition video at the subscription end and the plug-in end effectively.

It should be appreciated that, the link list 2 includes the index numbers, and each index number includes a time sequence of a link (2020.10.01, 2020.10.02, 2020.10.03, . . . ), an Arabic numeral (1, 2, 3, . . . ), a letter (A/a, B/b, C/c, . . . ), etc. As shown in FIG. 5, sid represents the index number, and it is used to track or guide the streaming media data.

The information about the streaming media data corresponding to each index number sid is further stored in the link list 2. The information about the streaming media data in the link list 2 is arranged in accordance with a time sequence of play data packets uploaded by the pushing end or a time sequence of live data packets published by the pushing end. The information about the streaming media data in the link list 2 includes specific contents corresponding to the connection request in the sequence list 1, so the client is capable of finding the unique streaming media data in accordance with the index number the first time. In this way, it is able to find the streaming media data in time, thereby to accelerate the pushing of the streaming media data.

The information about the streaming media data for example includes the live data packets and the play data packets. Each live data packet or play data packet is provided with a unique index number sid, so as to track a live or play resource. The sid is a unique identity number for identifying the live data packet or the play data packet. For example, the sid is stored in the link list 2.

When the live data packets are stored in the link list 2, as shown in FIG. 5, merely 16 latest live data packets are cached. When a subscription end server and a plug-in end server are online, latest live data streams are pushed to the subscription end and the plug-in end immediately. At most 25 live data packets are cached in the cache server within 1 second, so 25 or fewer live data packets, e.g., 8, 18 or 25 live data packets, are cached in the cache dictionary. It should be appreciated that, the more the cached live data packets, the larger the volume of the live data; the less the data volume of the cached play data packets, the less the live data packets to be updated, and the shorter the time for updating. In other words, the live data packet is updated more rapidly, so it is able to ensure the timeliness of the live data packet.

When the play data packets are stored in the link list 2, as shown in FIG. 5, in a play scenario, the play data packets are cached chronologically, and an expiry period of the play data packet is set by the user. For example, when the expiry period of the play data packet is one day (24 hours), merely play data packets on the very day are stored in the cache server 10, and all the play data packets before the very day become invalid and are deleted, so as to ensure the timeliness of the play data packet.

The connection requests in the sequence list correspond to the pieces of information about the streaming media data respectively. Hence, when the client transmits a subscription request to the cache server or a registration request to the plug-in end, the client is capable of searching for a corresponding index number and accurately finding the information about the streaming media data corresponding to the request instantaneously.

Figure 7:
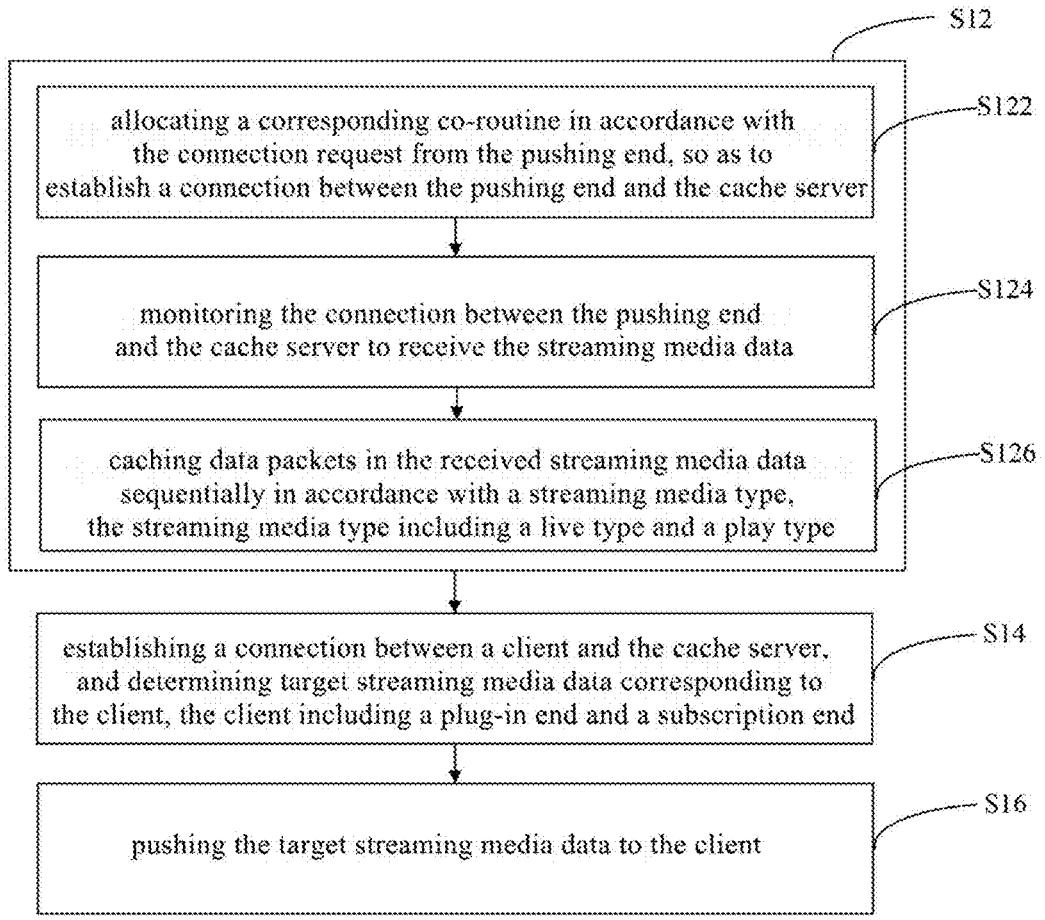
FIG. 7 is another flow chart of the method for processing the streaming media data according to one embodiment of the present disclosure.

As shown in FIG. 7, in some embodiments of the present disclosure, S12 further includes: S122 of allocating a corresponding co-routine in accordance with the connection request from the pushing end, so as to establish a connection between the pushing end and the cache server; S124 of monitoring the connection between the pushing end and the cache server to receive the streaming media data; and S126 of caching data packets in the received streaming media data sequentially in accordance with a streaming media type, the streaming media type including a live type and a play type.

Figure 8:
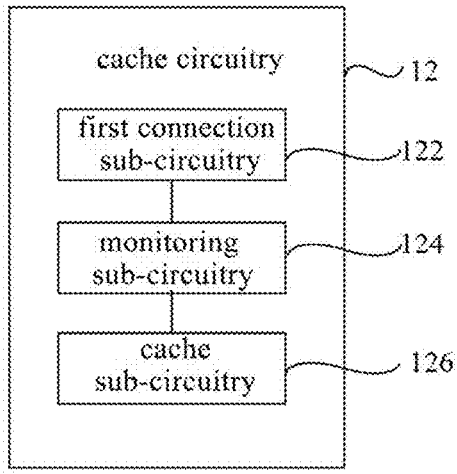
FIG. 8 is a schematic view showing a cache circuitry in the cache server according to one embodiment of the present disclosure.

As shown in FIG. 8, the cache circuitry 12 includes a first connection sub-circuitry 122, a monitoring sub-circuitry 124 and a cache sub-circuitry 126.

It should be appreciated that, S122 is implemented by the first connection sub-circuitry 122, S124 is implemented by the monitoring sub-circuitry 124, and S126 is implemented by the cache sub-circuitry 126. In other words, the first connection sub-circuitry 122 is configured to allocate a corresponding co-routine in accordance with the connection request from the pushing end, so as to establish a connection between the pushing end and the cache server, the monitoring sub-circuitry 124 is configured to monitor the connection between the pushing end and the cache server to receive the streaming media data, the cache sub-circuitry 126 is configured to cache data packets in the received streaming media data sequentially in accordance with a streaming media type, and the streaming media type includes a live type and a play type.

To be specific, at first, when the first connection sub-circuitry 122 allocates a corresponding co-routine in accordance with the connection request from the pushing end so as to establish the connection between the pushing end and the cache server, the following operations are performed.

a. The pushing end is connected in a wireless manner to the cache server 10 through the TCP. After the connection between the pushing end and the cache server has been established successfully, the pushing end needs to transmit a corresponding JSON character string (shown hereinafter) to the cache server 10. A JSON data exchange format is easily read and compiled by human beings and easily parsed and generated by a machine, and it is used to improve the network transmission efficiency.

b. The pushing end transmits the pushing connection request (i.e., the JSON character string) to the cache server, and then start to push the data packets in the streaming media data (during the pushing of the data packets in the streaming media data, it is necessary to push the data packets chronologically and in time in accordance with the pushing connection request, thereby to reduce the delay). The pushing connection request includes an identity, a protocol, a name and an address of the streaming media data (i.e., id, type (including rtmp and rtsp), name and addr in the JSON character string mentioned hereinafter).

c. Upon the receipt of the pushing connection request, the first connection sub-circuitry 122 in the cache server 10 allocates a separate co-routine for a live data stream or play data stream in accordance with a category of the pushed data stream, so as to process the live data stream and the play data stream respectively. The pushing connection request is a signal transmitted by the pushing end to the cache server 10 for pushing the data packets in the streaming media data.

Next, the monitoring sub-circuitry 124 in the cache server 10 monitors whether the connection between the pushing end and the cache server has been established successfully. If yes, the cache server 10 caches the data packets in the streaming media data sequentially through a connection (e.g., a connection mode such as wireless network) in accordance with the type of the data stream (live or play), so as to ensure that the cache server caches the live and play data streams in time and transmits the data packets in the cached streaming media data to the user group at the client instantaneously after the connection between the cache server and the client has been established. In other words, the cache server establishes local monitoring through the monitoring sub-circuitry, and waits for a new access.

To be specific, the pushing end accesses the cache server as follows. A pushing connection is added into a pool corresponding to the pushing end. The cache server 10 starts the co-routine to monitor the connection, and waits to receive the data packets in the streaming media data. In addition, the cache server also needs to initialize a cached object, and store the received data packets in a cache.

A pulling end and the plug-in end access the cache server as follows. The pushing connection is added into pools corresponding to the pulling end and the plug-in end. The cache server 10 looks up the cache dictionary to determine whether there is a corresponding resource (when the streaming media data is the play data stream, a separate co-routine is started to read the resource, and when the streaming media data is the live data stream, no processing is required, and the co-routine corresponding to the resource writes the received data packets sequentially into a connection pool of a pool subscribing the resource).

Figure 9:
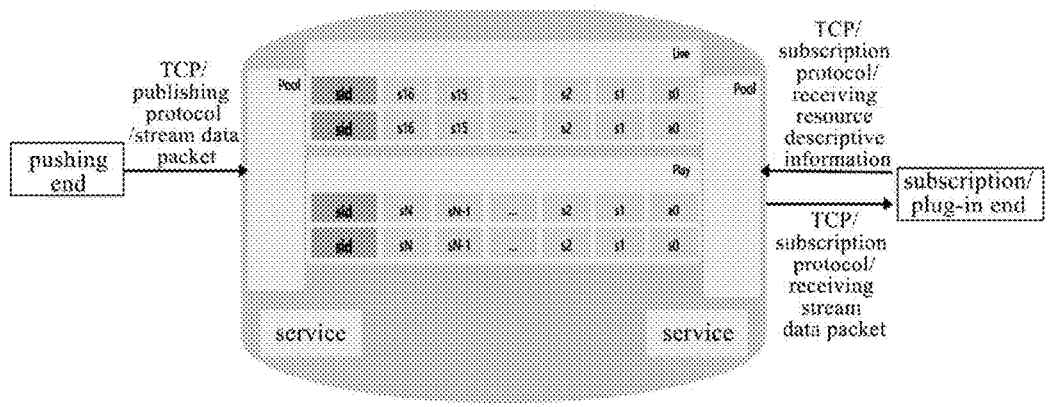
FIG. 9 is another schematic view showing a scenario for the method for processing the streaming media data according to one embodiment of the present disclosure.

A plug-in access is described as follows. When it is necessary to store the streaming media data or duplicate, replace or watermark the streaming media data at a third party, these services are determined by the third-party plug-in end (as shown in FIG. 9) in accordance with the requirement on the plug-in access.

In order to establish the connection between each of the pushing end, the subscription end the plug-in end and the cache server, thereby to cache and push the relevant streaming media data in time, how to establish the connection among the pushing end, the subscription end and the plug-in end will be discussed hereinafter. The pushing end refers to a client service group for publishing the live video or the play video, the subscription end refers to a client service group for subscribing the live video or the play video, and the plug-in end refers to a third-party client service group for watermarking the play video or the live video, replacing an on-going live or play resource, or duplicating the live or play resource.

In some embodiments of the present disclosure, the pushing end is connected to the cache server through the TCP and transmits the pushing connection request through the JSON character string, and/or the client is connected to the cache server through the TCP and transmits the client connection request through the JSON character string.

To be specific. The pushing end is connected to the cache server through the TCP, and then transmits the pushing connection request to the cache server 10 through the JSON character string. At this time, the JSON character string is expressed as follows:

```
{
"op": "publish",
"id": "sd434tf3e45tre",
"type": "rtmp", // rtmp, rtsp, file;
"name": "/play/test",// /play represents a play video, /live represents a live video
"addr": "10.1.132.21",
}.
```

When the client is the subscription end, the client is connected to the cache server through the TCP, and transmit the client connection request through the JSON character string. To be specific, the JSON character string is expressed as follows:

```
{
"op type":"subscribe",
"id":"sd434tf3e45tre"
"type":"rtmp",// rtmp, rtsp,file;
"name":"/play/test", // /play represents a play video, /live represents a live video
"addr":"10.1.132.21",
}.
```

When the client is the plug-in end, the client is connected to the cache server through the TCP, and transmits the client connection request through the JSON character string. To be specific, the JSON character string is expressed as follows:

```
{
"op":"plugin",
"type":new,copy,replace;
"name":"/play/test", // /play represents a play video, /live represents a live video
"addr":"10.1.132.21",
"token":"123456",
}.
```

In other words, when a registration type op of the client is the plug-in end, "type" represents "new" (taking a returned stream as a new media resource), "copy" (copying the live or play resource) or "replace" (replacing the on-going live or play resource). To be specific, "new" represents the transmission of a designated resource a plug-in address and storing a returned data packet in a cache area designated by a system, "copy" represents the copying of the designated resource to the plug-in address, and "replace" represents the transmission of the designated resource to the plug-in address and storing the returned data packet in the cache area designated by the system.

A timeout for a new connection between the plug-in end and the cache server is 60s, i.e., when there is no requested resource in the cache server within 60s, the connection between the plug-in end and the cache server is automatically interrupted.

Figure 10:
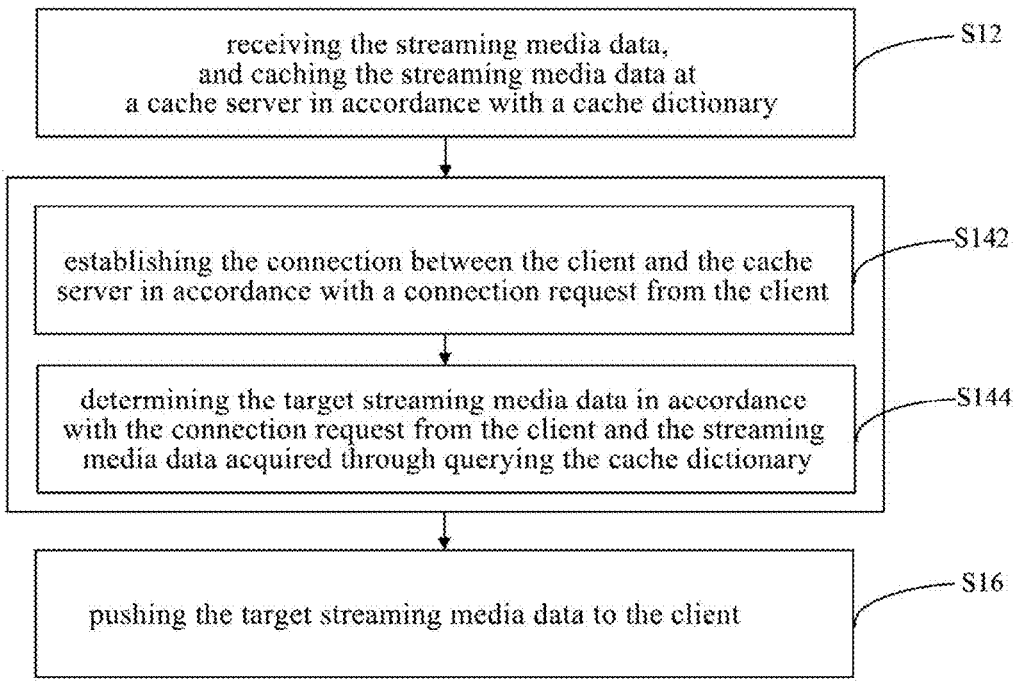
FIG. 10 is yet another flow chart of the method for processing the streaming media data according to one embodiment of the present disclosure.

Next, as shown in FIG. 10, in some embodiments of the present disclosure, S14 further includes: S142 of establishing the connection between the client and the cache server in accordance with a connection request from the client; and S144 of determining the target streaming media data in accordance with the connection request from the client and the streaming media data acquired through querying the cache dictionary.

Figure 11:
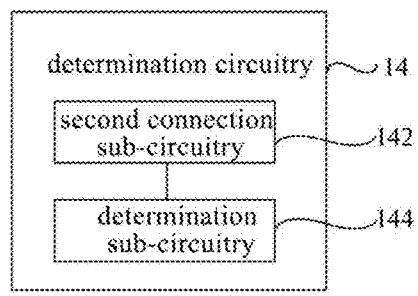
FIG. 11 is a schematic view showing a determination circuitry in the cache server according to one embodiment of the present disclosure.

As shown in FIG. 11, the determination circuitry 14 includes a second connection sub-circuitry 142 and a determination sub-circuitry 144.

It should be appreciated that, S142 is implemented by the second connection sub-circuitry 142, and S144 is implemented by the determination sub-circuitry 144. In other words, the second connection sub-circuitry 142 is configured to establish the connection between the client and the cache server in accordance with the connection request from the client, and the determination sub-circuitry 144 is configured to determine the target streaming media data in accordance with the connection request from the client and the streaming media data acquired through querying the cache dictionary.

To be specific, the connection request from the client includes a subscription connection request and a plug-in connection request. The subscription connection request includes an identity, a type, a name and an address of the streaming media data, and the plug-in connection request includes the type, the name and authentication of the streaming media data. On the basis of FIG. 5, whether there is the subscription end corresponding to the streaming media data is queried in the poll of the cache dictionary in accordance with the connection request from the client, and when there is the streaming media data, the streaming media data is pushed to the corresponding subscription end.

Figure 12:
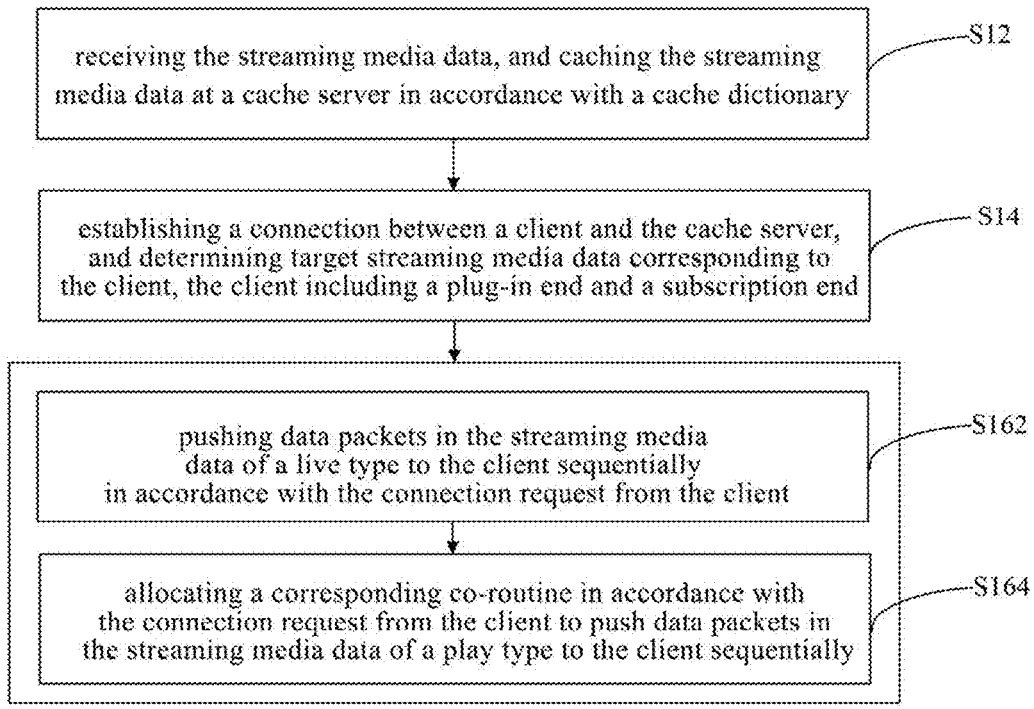
FIG. 12 is still yet another flow chart of the method for processing the streaming media data according to one embodiment of the present disclosure.

As shown in FIG. 12, in some embodiments of the present disclosure, S16 further includes: S162 of pushing data packets in the streaming media data of a live type to the client sequentially in accordance with the connection request from the client; and S164 of allocating a corresponding co-routine in accordance with the connection request from the client to push data packets in the streaming media data of a play type to the client sequentially.

Figure 13:
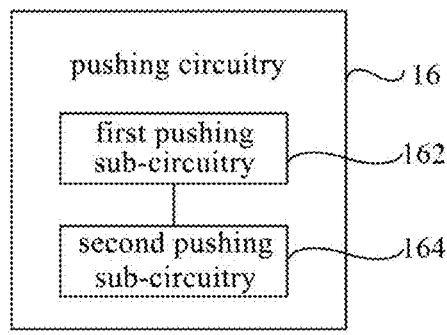
FIG. 13 is a schematic view showing a pushing circuitry in the cache server according to one embodiment of the present disclosure.

As shown in FIG. 13, the pushing circuitry 16 includes a first pushing sub-circuitry 162 and a second pushing sub-circuitry 166.

It should be appreciated that, the first pushing sub-circuitry 162 is configured to push data packets in the streaming media data of a live type to the client sequentially in accordance with the connection request from the client, and the second pushing sub-circuitry 166 is configured to allocate a corresponding co-routine in accordance with the connection request from the client to push data packets in the streaming media data of a play type to the client sequentially.

To be specific, the connection request from the client includes a subscription connection request and a plug-in connection request from the client. The subscription connection request includes an identity, a type, a name and an address of the streaming media data, and the plug-in connection request includes the type, the name and authentication of the streaming media data.

To be specific, upon the receipt of the subscription connection request from the subscription end, the cache server 10 adds the subscription connection request into the pool, and then performs the service processing in accordance with a type of resource for the subscription connection request. When the streaming media data is of a live type and the subscription connection request has been added into the pool, a co-routine for the live data stream takes charge of writing each data packet into the subscription connection request, and pushes the data packets in the live streaming media data sequentially to the client (the subscription end or the plug-in end). When the streaming media data is of a play type, a co-routine is started separately by the cache server 10 to read the data packets in the play streaming media data, and push the play data packets to the client (the subscription end or the plug-in end) sequentially.

Co-routine is more lightweight than thread. Just like that one process includes a plurality of threads, one thread includes a plurality of co-routines. The process is an instance started by an application, and it includes codes, opened file resources, data resources, and a separate memory space. The thread belongs to the process, and it is an actual executor of a program. One process at least includes one main thread and more child threads, and each thread has its own stack space.

Hence, upon the receipt of the pushing connection request from the pushing end, the cache server 10 stores the pushing connection request in the form of pool, and the pool is a part of the sequence list 1. In addition, upon the receipt of the connection requests from the subscription end and the plug-in end, the cache server 10 stores the connection requests in the form of pool after the subscription end and the plug-in end are connected to the cache server through the TCP. In other words, the pool in the cache server 10 is capable of managing the connections with the pushing end, the subscription end and the plug-in end. In the embodiments of the present disclosure, the cache server 10 manages the connections with the pushing end, the subscription end and the plug-in end using a data dictionary structure, so it is able to rapidly search in the cache server a connection data stream corresponding to the established connection.

It should be appreciated that, in some embodiments of the present disclosure, when the streaming media data is of a live type and the cache server is disconnected from the corresponding pushing end, the connection between the cache server and the corresponding client is interrupted, and then the streaming media data cached in the cache server is removed. In other words, when the streaming media data is a live video, the pushing end is disconnected from the cache server, and the cache server closes all the subscription ends and plug-in ends corresponding to the resource, and empties the cached link list, so as to ensure the timeliness of the streaming media data of the live type, thereby to cache and push a next live video to the subscription end and the plug-in end in time. When the streaming media data is of a play type, the pushing end is disconnected from the cache server, and the cache server does not perform any processing but reserve the currently cached data and link list.

In addition, when the subscription end and the plug-in end are disconnected from the cache server and the streaming media data of a live type, the cache server updates a connection state in the pool, and when the streaming media data is of a play type, the cache server closes a co-routine started separately.

The embodiments of the apparatus and the method thereof have been described hereinbefore using block diagrams, flow charts and/or examples. It should be appreciated that, in the case that the block diagrams, flow charts and/or examples include one or more functions and/or operations, each function and/or operation included in the block diagrams, flow charts and/or examples may be implemented individually, or collectively, through hardware, software, firmware or essentially the combinations thereof. In one embodiment, several parts of the subject matter of the present disclosure may be implemented by an application specific integrated circuit (ASIC), a field programmable gate array (FPGA), a digital signal processor (DSP) or any other integration formats. Any module or unit in the embodiments of the present disclosure may be implemented mechanically or electronically. For example, one module may include a permanent circuit or a logic element for a specific operation. The module may also include a programmable logic element or circuit (e.g., a general-purpose processor or any other programmable processors) configured temporarily by the software, so as to perform the specific operation. However, it should also be appreciated that, some aspects of the embodiments of the present disclosure may be, completely or partially, implemented equivalently in an integrated circuit as one or more programs capable of being run on one or more computers (e.g., computer systems), one or more programs capable of being run on one or more processors (e.g., microprocessors), firmware, or essentially combinations thereof. According to the present disclosure, a person skilled in the art has the capability of designing the circuits and/or writing software and/or firmware codes. In addition, it should further be appreciated that, mechanisms of the subject matter of the present disclosure may be dispersed as program products in various forms, and regardless of the types of a signal-carrying medium actually used for the description; the signal-carrying medium may be applicable to the illustrative embodiments of the subject matter of the present disclosure. Examples of the signal-carrying medium include, but not limited to, a recording-type medium such as a soft disc, a hard disc drive, a compact disc (CD), a digital versatile disc (DVD), a digital tape and a computer memory; and a transmission-type medium such as a digital and/or analogue communication medium (e.g., an optical fiber/cable, a waveguide tube, a wired communication link and a wireless communication link).

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for processing streaming media data, comprising:
   receiving the streaming media data, and caching the streaming media data at a cache server in accordance with a cache dictionary;
   establishing a connection between a client and the cache server, and determining target streaming media data corresponding to the client, the client comprising a plug-in end and a subscription end; and
   pushing the target streaming media data to the client,
   wherein the cache dictionary comprises a management data pool and a link list, and the management data pool comprises a sequence list;
   the sequence list comprises a first connection request and a corresponding pushing connection transmitted by a pushing end to the cache server, a second connection request and a corresponding subscription connection transmitted by the subscription end to the cache server, and a third connection request and a corresponding plug-in connection transmitted by the plug-in end to the cache server; and
   the link list comprises index numbers and information about the streaming media data corresponding to each index number.

2. The method according to claim 1, wherein the index numbers correspond to pushing connections and plug-in connections in the sequence list respectively.

3. The method according to claim 1, wherein the establishing the connection between the client and the cache server and determining the target streaming media data corresponding to the client comprises:
   establishing the connection between the client and the cache server in accordance with a connection request from the client; and
   determining the target streaming media data in accordance with the connection request from the client and the streaming media data acquired through querying the cache dictionary.

4. The method according to claim 3, wherein the receiving the streaming media data and caching the streaming media data at the cache server in accordance with the cache dictionary comprises:
- allocating a corresponding co-routine in accordance with the connection request from the pushing end, so as to establish a connection between the pushing end and the cache server;
- monitoring the connection between the pushing end and the cache server to receive the streaming media data; and
- caching data packets in the received streaming media data sequentially in accordance with a streaming media type, the streaming media type comprising a live type and a play type.

5. The method according to claim 4, wherein the pushing end is connected to the cache server through a Transmission Control Protocol (TCP) and configured to transmit the connection request through a JavaScript Object Notation (JSON) character string, and/or the client is connected to the cache server through the TCP and configured to transmit the connection request through JSON character string.

6. The method according to claim 5, wherein the connection request from the pushing end comprises an identity, a type, a name and an address of the streaming media data, the connection request from the client comprises a subscription connection request and a plug-in connection request, the subscription connection request comprises the identity, the type, the name and the address of the streaming media data, and the plug-in connection request comprises the type, the name and authentication of the streaming media data.

7. The method according to claim 4, wherein the pushing the target streaming media data to the client comprises:
- pushing data packets in the streaming media data of the live type to the client sequentially in accordance with the connection request from the client; and
- allocating a corresponding co-routine in accordance with the connection request from the client to push data packets in the streaming media data of the play type to the client sequentially.

8. The method according to claim 7, wherein when the streaming media type is the live type and the cache server is disconnected from the pushing end, the connection between the cache server and the corresponding client is interrupted, and the streaming media data cached in the cache server is removed.

9. An electronic device, comprising a processor and a memory storing therein a computer program, wherein the computer program is executed by the processor so as to implement the method according to claim 1.

10. A cache server, comprising:
- a cache circuitry configured to receive streaming media data, and cache the streaming media data at the cache server in accordance with a cache dictionary;
- a determination circuitry configured to establish a connection between a client and the cache server, and determine target streaming media data corresponding to the client, the client comprising a plug-in end and a subscription end; and
- a pushing circuitry configured to push the target streaming media data to the client,
- wherein the cache dictionary comprises a management data pool and a link list, and the management data pool comprises a sequence list;
- the sequence list comprises a first connection request and a corresponding pushing connection transmitted by a pushing end to the cache server, a second connection request and a corresponding subscription connection transmitted by the subscription end to the cache server, and a third connection request and a corresponding plug-in connection transmitted by the plug-in end to the cache server; and
- the link list comprises index numbers and information about the streaming media data corresponding to each index number.

11. The cache server according to claim 10, wherein the index numbers correspond to pushing connections and plug-in connections in the sequence list respectively.

12. The cache server according to claim 10, wherein the determination circuitry is further configured to:
- establish the connection between the client and the cache server in accordance with a connection request from the client; and
- determine the target streaming media data in accordance with the connection request from the client and the streaming media data acquired through querying the cache dictionary.

13. The cache server according to claim 12, wherein the cache circuitry is further configured to:
- allocate a corresponding co-routine in accordance with the connection request from the pushing end, so as to establish a connection between the pushing end and the cache server;
- monitor the connection between the pushing end and the cache server to receive the streaming media data; and
- cache data packets in the received streaming media data sequentially in accordance with a streaming media type, the streaming media type comprising a live type and a play type.

14. The cache server according to claim 13, wherein the pushing end is connected to the cache server through a Transmission Control Protocol (TCP) and configured to transmit the connection request through a JavaScript Object Notation (JSON) character string, and/or the client is connected to the cache server through the TCP and configured to transmit the connection request through JSON character string.

15. The cache server according to claim 14, wherein the connection request from the pushing end comprises an identity, a type, a name and an address of the streaming media data, the connection request from the client comprises a subscription connection request and a plug-in connection request, the subscription connection request comprises the identity, the type, the name and the address of the streaming media data, and the plug-in connection request comprises the type, the name and authentication of the streaming media data.

16. The cache server according to claim 13, wherein the pushing circuitry is further configured to:
- push data packets in the streaming media data of the live type to the client sequentially in accordance with the connection request from the client; and
- allocate a corresponding co-routine in accordance with the connection request from the client to push data packets in the streaming media data of the play type to the client sequentially.

17. The cache server according to claim 16, wherein when the streaming media type is the live type and the cache server is disconnected from the pushing end, the connection between the cache server and the corresponding client is interrupted, and the streaming media data cached in the cache server is removed.

18. A non-transitory computer-readable storage medium storing therein a computer program, wherein the computer program is executed by one or more processors, so as to:
receive streaming media data, and cache the streaming media data at a cache server in accordance with a cache dictionary;
establish a connection between a client and the cache server, and determine target streaming media data corresponding to the client, the client comprising a plug-in end and a subscription end; and
push the target streaming media data to the client,
wherein the cache dictionary comprises a management data pool and a link list, and the management data pool comprises a sequence list;
the sequence list comprises a first connection request and a corresponding pushing connection transmitted by a pushing end to the cache server, a second connection request and a corresponding subscription connection transmitted by the subscription end to the cache server, and a third connection request and a corresponding plug-in connection transmitted by the plug-in end to the cache server; and
the link list comprises index numbers and information about the streaming media data corresponding to each index number.

19. The non-transitory computer-readable storage medium according to claim 18, wherein the index numbers correspond to pushing connections and plug-in connections in the sequence list respectively.

20. The non-transitory computer-readable storage medium according to claim 18, wherein the establishing the connection between the client and the cache server and determining the target streaming media data corresponding to the client comprises:
establishing the connection between the client and the cache server in accordance with a connection request from the client; and
determining the target streaming media data in accordance with the connection request from the client and the streaming media data acquired through querying the cache dictionary.

* * * * *